M. A. EWALD.
WHEEL.
APPLICATION FILED JULY 16, 1910.
1,011,334.
Patented Dec. 12, 1911.
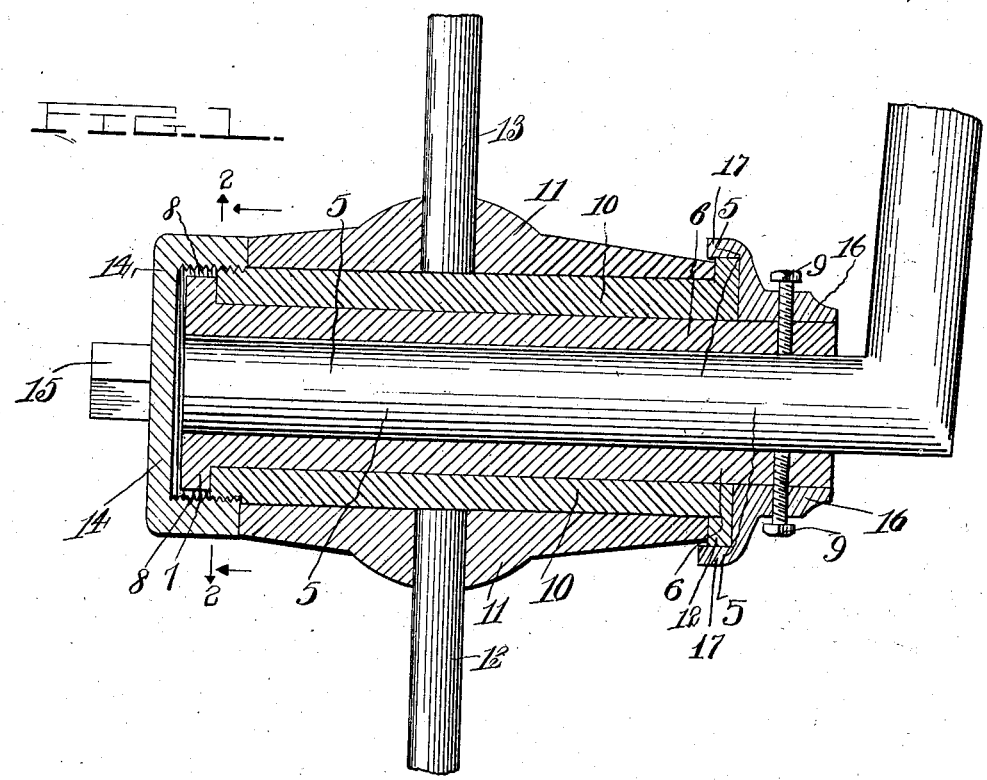
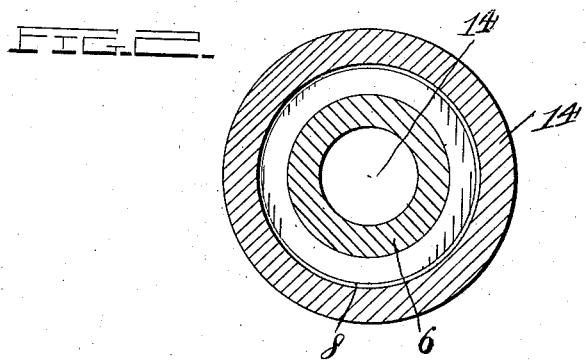
Witnesses
JH Taylor
Inventor
M. A. Ewald.
By
Attorneys

UNITED STATES PATENT OFFICE.

MARTIN A. EWALD, OF NICOLLET, MINNESOTA.

WHEEL.

1,011,334.  Specification of Letters Patent.  Patented Dec. 12, 1911.

Application filed July 16, 1910. Serial No. 572,333.

*To all whom it may concern:*

Be it known that I, MARTIN A. EWALD, a citizen of the United States, residing at Nicollet, in the county of Nicollet, State of Minnesota, have invented certain new and useful Improvements in Wheels; and I do hereby declare the following to be a full, clear, and exact description of the invention, such as will enable others skilled in the art to which it appertains to make and use the same.

The invention relates to a wheel and more particularly to the class of dust proof wheel boxes.

The primary object of the invention is the provision of a wheel box in which the hub of the wheel may be longitudinally adjusted upon the journal end of the axle and which axle will be protected from dust, grit or other foreign matter thus obviating any injury to the same.

Another object of the invention is the provision of a boxing by which the hub of the wheel may be readily and quickly removed from the journal end of the axle and that is practically dust proof and also that may be conveniently supplied with lubricant.

A further object of the invention is the provision of a hub attaching device which is adapted for use on sulky plow wheels or other agricultural implements and that is readily and easily assembled for connecting the wheels to the axles and also that will relieve the axle from wear and protect it from dust and dirt.

A still further object of the invention is the provision of a hub attaching device which is simple in construction, thoroughly reliable and efficient in operation and inexpensive in manufacture.

With these and other objects in view the invention consists in the construction, combination and arrangement of parts as will be hereinafter more fully described, illustrated in the accompanying drawings, disclosing, the preferred form of embodiment of the invention and pointed out in the claims hereunto appended.

In the drawings:—Figure 1 is a central longitudinal sectional view of a wheel hub and axle with the invention applied thereto. Fig. 2 is a sectional view on the line 2—2 of Fig. 1.

Similar reference characters indicate corresponding parts throughout the several views in the drawings.

Referring to the drawings by numerals 5 designates the journal end of an axle of the ordinary well-known construction on which is fitted an inner sleeve 6 the same surrounding the said axle and is provided at its outer end with an outturned annular flange or shoulder 7 and this sleeve 6 has provided near its inner end at opposed sides, threaded openings to be engaged by fastening screws 9 which are adapted to bind on the outer surface of the axle 5 and hold the said inner sleeve 6 longitudinally adjusted thereon and from turning upon the said axle.

Surrounding the inner sleeve 6 is an outer sleeve forming a boxing 10 the latter being fitted in a hub 11 and is adapted to rotate upon the inner sleeve 6, the inner end of the outer sleeve 10 being provided with an outturned annular flange 12 forming a shoulder against which abuts the inner end of the said hub 11. This hub has fixed medially thereto outwardly extending radial spokes 13 with which is connected a felly (not shown) in the ordinary well-known manner.

A cap 14 is threaded to the sleeve 10 over the flange 7, and said cap is provided with an outwardly extending centrally located squared lug 15 projecting from the outer face of the said cap to be engaged by a wrench or other suitable tool whereby the said cap 14 may be attached and detached at will, the said cap serving as a dust proof closure for the outer end of the hub. The inner sleeve 6 is of considerably greater length than the outer sleeve 10 and has surrounding its inner end a removable cap 16 the same being provided with a circular flange 17 projecting from one face thereof and surrounding the annular flange 12 at the inner end of the outer sleeve thereby effecting a dust proof closure for the inner end of the hub.

The inner cap 16 is provided with threaded apertures adapted to register with the threaded apertures in the inner sleeves 6 near its inner end whereby the screws 9 may be passed through the cap for locking it to and against rotation on the inner end of the inner sleeve. The outer cap 14 is adapted to extend inwardly over the outer end of the outer sleeve 10 and abut against the outer end of the hub 11.

It will be clearly seen that the hub of the wheel is prevented from longitudinal displacement on the axle by reason of the inner and outer caps and also that both ends of the hub are closed so that dirt, dust or other foreign matter will be excluded. Also it will be observed that the inner sleeve 6 protects the journal end 5 of the axle thereby relieving the same from wear. The adjusting screws 9 enables the hub to be adjusted longitudinally on the journal end 5 of the axle.

From the foregoing it is thought that the construction and operation of the invention will be clearly obvious and therefore a more extended explanation has been omitted.

Having thus described my invention, what I claim is:

1. The combination with an axle; of a hub mounted for rotation thereon, an inner sleeve surrounding the axle and longitudinally adjustable thereon, means locking the said inner sleeve against rotation on the axle, an annular flange formed at the outer end of said sleeve, an outer sleeve surrounding said inner sleeve and having its outer end abutting against said flange, an annular flange formed at the inner end of said outer sleeve and abutting against the inner end of the hub and caps detachably connected to the outer end of the outer sleeve and the inner end of the inner sleeve.

2. The combination with an axle; of a hub mounted for rotation thereon, an inner sleeve surrounding the axle and longitudinally adjustable thereon, means locking the said inner sleeve against rotation on the axle, an annular flange formed at the outer end of said sleeve, an outer sleeve surrounding said inner sleeve and having its outer end abutting against said flange, an annular flange formed at the inner end of said outer sleeve and abutting against the inner end of the hub, a cap threaded on the outer end of the outer sleeve for inclosing the flange portion of the inner sleeve and a cap mounted upon the inner end of the inner sleeve and engaging the inner flange of the outer sleeve, said last mentioned cap being held from rotation on the inner sleeve by the locking means and having a forwardly extending flange engaged by the periphery of the inner flange.

In testimony whereof, I affix my signature, in presence of two witnesses.

MARTIN A. EWALD.

Witnesses:
 Ed. C. Dohannes,
 E. W. Currier.